United States Patent [19]

Labrousse

[11] Patent Number: 4,753,085

[45] Date of Patent: Jun. 28, 1988

[54] SINGLE-USE HEAT TRANSFER PACKAGING FOR DRINKS, FOODSTUFFS AND MEDICAMENTS

[76] Inventor: Bernard L. P. E. Labrousse, 19270 Donzenac-Avenue de Paris, Franqaise, France

[21] Appl. No.: 46,007

[22] Filed: May 5, 1987

[30] Foreign Application Priority Data

May 5, 1986 [FR] France .................................. 8606464

[51] Int. Cl.⁴ ................................................. F25D 3/10
[52] U.S. Cl. .......................................... 62/294; 62/4; 126/263
[58] Field of Search ............................ 62/4, 294, 457; 126/263

[56] References Cited

U.S. PATENT DOCUMENTS

| 3,970,068 | 7/1976 | Sato | 62/4 X |
| 4,528,218 | 7/1985 | Maione | 62/4 X |
| 4,640,264 | 2/1987 | Yamaguchi et al. | 126/263 |

Primary Examiner—Lloyd L. King
Attorney, Agent, or Firm—Pollock, Vande Sande and Priddy

[57] ABSTRACT

The invention relates to a single-use heat transfer packaging for drinks and foodstuffs which comprises a receptacle containing drink or food to be consumed, a thermal capsule being immersed at least partially into the drink or food, the said capsule having a portion which is deformable by pressure or by traction, triggering an exothermal or endothermal chemical reaction. The invention is applied mainly to the preserved foodstuffs and pharmaceuticals industries.

10 Claims, 3 Drawing Sheets

SINGLE-USE HEAT TRANSFER PACKAGING FOR DRINKS, FOODSTUFFS AND MEDICAMENTS

The invention relates to a single-use heat transfer packaging for drinks and foodstuffs which takes the general form of an unbreakable receptacle capable of heating or cooling a food or a drink without risk, the said drink itself possibly being an extemporaneous preparation from a solvent and a solute.

The object of the present invention is to create a single-use heat transfer packaging for drinks and foods which is of extremely simple design and which represents a viable product capable of meeting various needs of the user and the products to be packaged.

Another object of the present invention is to offer handling and operation suited to the chemical reaction triggered by the deformation of a capsule or of one of its parts or of its deformable walls.

The present invention aims to create a heat transfer packaging adapted to trigger the chemical reaction, liberation of solute from the drink and to the distribution of the food or drink.

Finally, the present invention has as its object the creation of a heat transfer packaging, the reliability of which is likewise enhanced by a temperature indication intended to signal that the normal conditions of use have been exceeded.

To this end, the invention relates to a single-use heat transfer packaging for drinks and foods, in that it comprises a receptacle containing the food or drink to be consumed, the heating or refrigerating part being a capsule which is at least partially immersed in the drink or food, this capsule comprising a part which is deformable by pressure or by traction and which triggers an exothermal or endothermal chemical reaction.

According to another characteristic feature of the invention, the receptacle is provided with a solute reservoir comprising a partition or stopper, cover, cap, which is fluid tight and openable or adapted to be perforated, or a fusible type reservoir or a folding pocket reservoir.

According to another feature of the invention, the periphery of the reservoir has hooking means such as shoulders, band, clips, screws or hooks for holding the capsule if the latter is separate from the packaging.

According to another feature of the invention, the receptacle comprises a deformable part.

According to another feature of the invention, the receptacle forms an assembly which is one piece with the capsule, or is independent of the said capsule.

According to another feature of the invention, the outer wall of the receptacle is lined with an insulating jacket.

According to another feature of the invention, the upper face of the receptacle has a means for dispensing the drink or food.

According to another feature of the invention, the capsule consists of an enclosure and a separator defining two fluidtight compartments containing chemical reagents.

According to another feature of the invention, the separator comprises a stopper or a perforator.

According to another feature of the invention, the separator is an injection separator comprising a disc or a cap which, pursuant to pressure on the deformable part of the capsule, causes the injection of liquid reagent into the solid reagent.

According to another feature of the invention, the packaging comprises a dispensing means such as an inner capsule on one or other of the opposite faces of the receptacle, the said receptacle or one of its faces having a folding and/or sliding zone.

According to another feature of the invention, the receptacle is provided with a push member which cooperates with a cam in order to deform the capsule.

According to another feature of the invention, the receptacle is provided with a prehensile member connected to a rod rigid with the deformable part of the capsule and making it possible to exert a traction movement.

Finally, according to another feature of the invention, the packaging comprises a temperature indicator.

The present invention will be more clearly understood with reference to an embodiment of the heat transfer package according to the invention, which is illustrated diagrammatically by way of non-limitative example in the appended drawings, in which.

Figure 1:
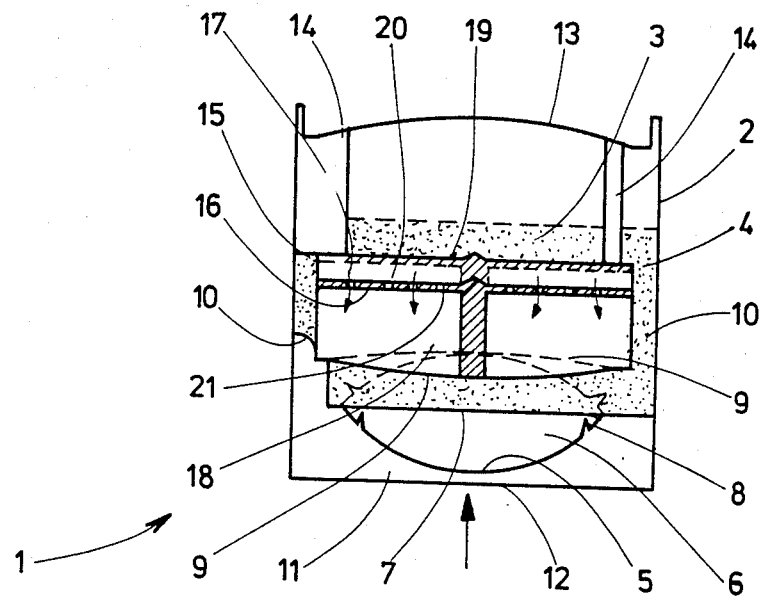
FIG. 1 is a lateral sectional view of a first embodiment of the heat transfer package.

In accordance with FIG. 1, the heat transfer package 1 consists of a receptacle 2 containing the drink, the food or the solvent 3. The receptacle 2 likewise comprises an at least partially immersed capsule 4 functioning as a reaction chamber. In this particular embodiment, the receptacle comprises an extemporaneously prepared drink. The lower part of the receptacle has a convex bottom 5 which can be deformed by pressure and which defines a reservoir 6 for the solute. The reservoir 6 is occluded by an openable or perforable fluid tight partition 7.

After pressure has been applied to the outside of the deformable bottom 5 of the receptacle, the solute reservoir 6 is opened by a push member or a perforator consisting, for example, of a barbed ring 8. A second pressure on the bottom 5 makes it possible to deform the bottom wall 9 of capsule 4 as indicated by the broken line. Around the periphery of the capsule 4 are shoulders 10. These shoulders may be of the screw type of may be replaced by clips, screws or rings, a thread, a casing, or hooks holding the capsule if the latter is autonomous and not rigid with the enclosure.

This type of mechanically opened reservoir may be replaced by a fusible reservoir incorporated in the receptacle and opening automatically during the course of heating by virtue of the heat given off by the heating portion.

In the case of a previously prepared foodstuff, the bottom of the receptacle 2 does not contain any reservoir for the solute. In accordance with this particular embodiment, the bottom of the receptacle 2 is deformable and may comprise a push member designed to facilitate deformation of the bottom wall 9 of the capsule 4, as indicated by the broken lines. Furthermore, the bottom wall of the heating or cooling capsule 4 may be likened to the bottom of the receptacle 2, the capsule 4 and the receptacle 2 being in a single piece.

It is likewise possible to exert pressure through the intermediary of a screw of key in order to deform the capsule 4.

It is likewise possible to provide an outer jacket around the receptacle 2. This jacket is an insulating jacket which lines the outside of the walls of the receptacle 2.

At its base, the receptacle 2 is provided with a support structure 11 to which can be fixed a partial or total double bottom 12 preventing any accidental deformation.

The upper wall 13 may be cut over its periphery by some adequate device or may be entirely removed by being unstuck. It is likewise possible to provide an inner capsule in this wall 13.

These elements are intended for distribution of dispensing of the food or drink. In the case of a separate capsule, it is likewise possible to provide either by way of addition or substitution, for supporting and fixing of the capsule 4 directly via the wall 13 which acts as a cover of the receptacle 2. Thus, elements can be used for supporting the capsule 4, such as posts 14. The system of posts may be replaced by clips, hooks, rings, shoulders or a screw. All these means may be independent and capable of being interposed between the receptacle 2 and the reaction chamber i.e. capsule 4.

The heating or refrigerating capsule 4 makes it possible to produce cold or heat by exothermal or endothermal chemical reaction. It is partially or totally immersed in the drink or the food which is to be heated or cooled. The capsule 4 comprises an enclosure 15 and a disc-shaped separator 16 defining a compartment 17 for the liquid chemical reagent on one side of separatar 16 and a compartment 18 for the solid chemical reagent.

The enclosure 15 has a deformable bottom wall 9. By the application of pressure to wall 9, the chemical reaction is triggered, bringing the liquid and solid reagents together. The deformation of the wall 9 due to the applied pressure produces a displacement of the separator 16 in the capsule into the liquid reagent compartment 18, as shown by broken line in FIG. 1, to inject the liquid reagent via orifices 21 in the separator 16 into the solid reagent compartment 17 as shown by the arrows in FIG. 1.

It is possible to provide a shoulder on the inside face of the enclosure 15, bosses or a horizontal or helical rib system, or also channels.

It is likewise possible to increase the area of the exchange surface by providing bosses on the enclosure 15. The non-deformable face 19 of the enclosure may be given undulating or projecting configurations. The separator 16 brings the solid and liquid chemical reagents into contact with one another by displacement.

The separator 16 may be a separator with a stopper or a perforator. This is not the case in this particular drawing. The separating partition 20 of the separator 16 has at least one orifice in it. It is completed by a withdrawable stopper. It is likewise possible to provide a separating partition 20 which is flexible, perforable and retractable and which is completed by a perforator.

According to the particular embodiment shown in FIG. 1, the separator 16 is an element which acts by injection. Thus, deformation of the bottom 9 of the capsule 4 causes a displacement of a disc or cap giving rise to regular injection of liquid reagent into the solid reagent, the elasticity of the bottom wall 9 causing upon injection a constant value because it is independent of the pressure or traction exerted on wall 9. Injection is favoured by the presence of orifices 21 disposed in the disc. Fluid tightness is then ensured by a partition or diaphragm or by valves or even by the positioning of some surface coating or film. The orifices 21 may likewise take the form of leader holes of micro orifices or may be supplemented by occluding plugs or may be associated with perforating tubes.

The disc consituting the separator 16 is capable of having barbs on its surface and channels on its periphery. In another embodiment, the separator 16 may be deformable, so that when it is displaced it changes from a concave shape with occluded orifices to a convex shape with wide open orifices.

The separator 16 may likewise consist of a movable disc or cap, pierced or otherwise. Dispersion orifices or the occluding supplement are then situated in a frame, a second fixed disc or partition placed on one side or the other of the movable disc which may be provided to rotate about its axis when it is displaced. It is likewise possible to provide a pocket resting on the disc containing the liquid reagent.

Figure 2:
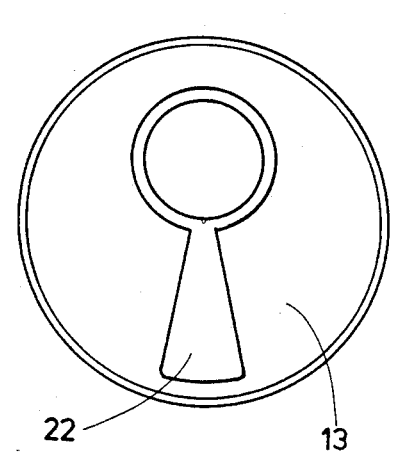
FIG. 2 is a plan view of the heat transfer package according to FIG. 1.

According to FIG. 2, the package 1 viewed from above comprises on its wall 13 a distributing means 22 for dispensing the drink or food.

Figure 3:
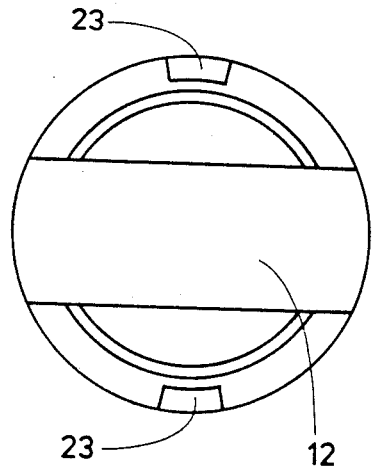
FIG. 3 is a view of the underneath of the package according to FIG. 1.

According to FIG. 3, the package 1 seen from below comprises on its bottom surface a double bottom 12 and also shoulders 23.

Figure 4:
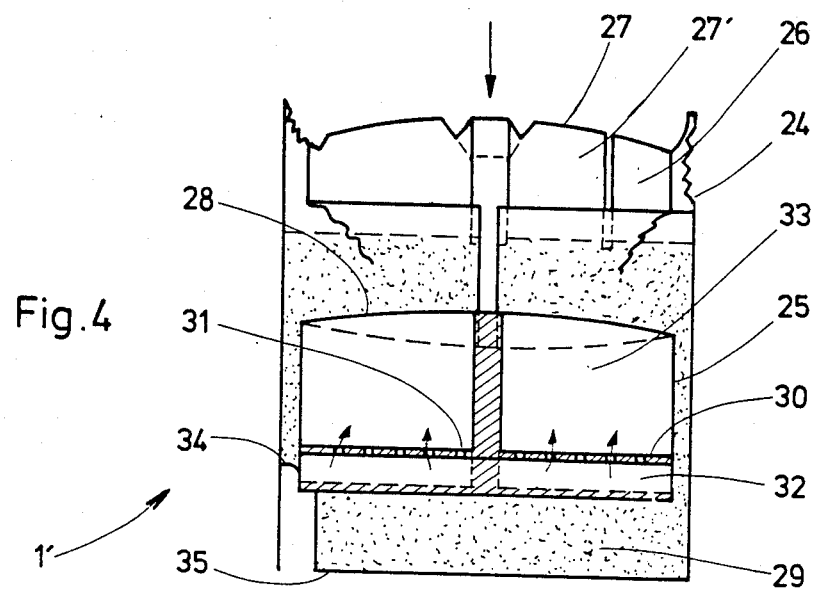
FIG. 4 is a lateral sectional view of a second embodiment of heat transfer package.

According to FIG. 4, the package 1' likewise comprises a receptacle 24 provided with a thermal capsule 25. In this particular form of embodiment, the reservoir 26 which has to be provided for an extemporaneous preparation is placed in the upper part of the receptacle 24 below the upper deformable wall 27 or between the thermal capsule 25 and the wall 35.

This reservoir is intended to contain the solute or the solvent, the wall 27 possibly comprising a vent.

Instead of this mechanically opened reservoir, it is possible to provide a fusible reservoir.

According to the particular embodiment, pressure is exerted to the upper wall 27 in order partially or totally to change its shape until it reaches the position shown by the broken line 27'. The pessure acts on the deformable walls 28 of the thermal capsule 25. This latter is immersed in the drink or food 29. The thermal capsule 25 is provided with a separator 30 in which there are orifices 31. The separator 30 divides the thermal capsule into a compartment 32 for containing the liquid reagent and a compartment 33 for the solid reagent. The thermal capsule 25 is, furthermore, maintained in position by a shoulder 34. If it is distinct from the receptacle, then it is not in one piece with the receptacle.

According to a closely related embodiment, the receptacle 24 comprises a folding and/or sliding portion at the level of the reservoir 26, the wall 27 being non-deformable. This application of a pressure to this folding and/or sliding portion makes it possible to open the reservoir and trigger the reaction. This folding part can be lined on the outside with a security ring which is removable for use and which prevents any involuntary usage. Triggering of the reaction may also be performed by the wall 35. According to a closely related embodiment, it is the wall 27 which comprises the folding portion.

By pressure on the deformable wall 27 directly or through a push member or perforator, the deformation can be transmitted to the capsule 25 by means of a push member, a screw or a key. In contrast to the embodiments shown in FIGS. 1 to 3, distribution may be carried out both at the level of the wall 27 and at the level of the wall 35 of the receptacle 24, the wall of the capsule then becoming the wall of the receptacle. Distribution may be performed by totally cutting out or detaching and removing one or other of the walls 27 or 35. It is likewise possible to provide protection at the level of the deformable wall 27.

Figure 5:
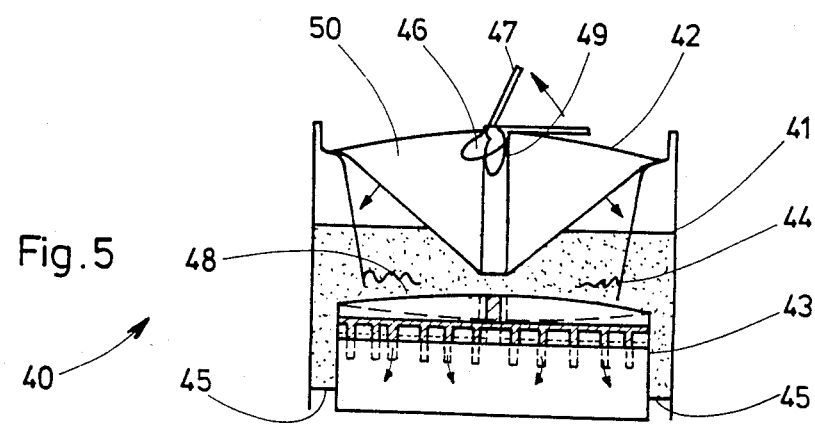
FIG. 5 is a lateral sectional view of a third embodiment of heat transfer package.

According to FIG. 5, the heat transfer package 40 constitutes a third embodiment. It is substantially constituted in the same way as the package 1' shown in the preceding FIG. 4. Thus, the receptacle 41 comprises an upper deformable wall 42. A thermal capsule 43 is situated in the inner part of the receptacle 41 so that it can be immersed in the drink or foodstuff 44. The capsule 43 may be supplemented by a peripheral shoulder 45. According to this particular embodiment, only the command for deforming the upper wall 42 differs. This command is given by a push member 46 provided with a lever 47 acting on the deformable wall 48 of the thermal capsule 43. The upper wall 42 of the receptacle 41 may be deformable or not. The action of the push member 46 is exerted directly on the thermal capsule 43.

The push member 46 which may be fully contained in the reservoir 50 co-operates with a cam 49. The lever 47 may be replaced by a screw or by a key.

For extemporaneous preparation, the flexible solute reservoir 50 which is pinched to the closed condition may be placed in the upper part of the receptacle 41. However, it is possible to imagine the solute reservoir being disposed on the other side of the thermal capsule 43.

A pocket reservoir may be envisaged, may have a mouth which can be torn off, unstuck, opened out, the mouth being connected to the distributor or to one of the parts of the control means or to the wall 42 in such a way as to be opened upon manipulation.

This type of reservoir may be replaced by a fusible reservoir which, as when there is not reservoir at all, makes it possible to dispense with the push member operation; triggering of the reaction is then carried out by direct pressure on the deformable wall 48 of the thermal capsule, a wall which is then in its lower position which may likewise in this case be likened to the bottom wall of the receptacle 41.

According to this form of embodiment, distribution may be performed by an inner capsule or an outer tube or a socket disposed either on the upper face or on the underside of the receptacle 41. It is possible to combine distribution with the control of push member 46 which then provides for the functions of releasing solute, triggering chemical reactions or distribution of the drink. It is likewise possible to envisage removal or detachment or total peripheral cutting of the upper wall 42.

Figure 6:
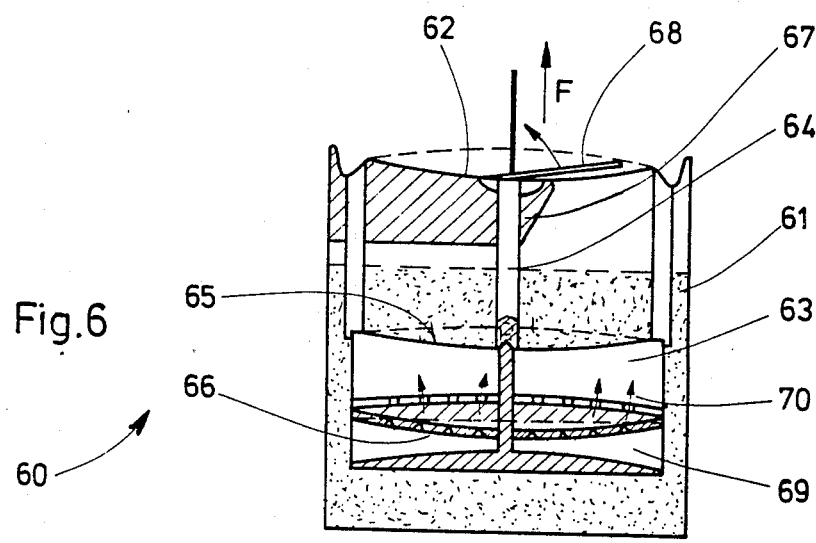
FIG. 6 is a lateral sectional view of a fourth embodiment of heat transfer package.

According to FIG. 6, in contrast to the embodiment previously described, the package 60 is intended to be operated by traction and not by pressure. This traction is applied according to the arrow F. The package 60 is provided with a receptacle 61 comprising a deformable top face 62. The receptacle houses the thermal capsule 63. The exothermal or endothermal chemical reaction is obtained by pulling on an external gripping means 68 carried by the receptacle 61. The said means is connected to a rod 64 rigid with the deformable face 65 of the thermal capsule 63. The face 65 is likewise rigid with the separator 66.

In this form of embodiment, it is likewise possible to provide for a solute or solvent reservoir 67 in the upper part of the receptacle 61 or in the lower part, the reservoir receiving its own command. This solute reservoir which is mechanically opened may be replaced by a fusible reservoir. As in the other embodiments, the separator 66 provides in the capsule a compartment 69 for liquid reagent and a compartment 70 for solid reagent.

In accordance with this particular embodiment, the drink or food is distributed via the gripping means or via a bent-over external element. Furthermore, as in the previous embodiments, the receptacle and the capsule may be in a single piece, the bottom of the capsule then becoming a part of the bottom of the receptacle.

Figure 7:
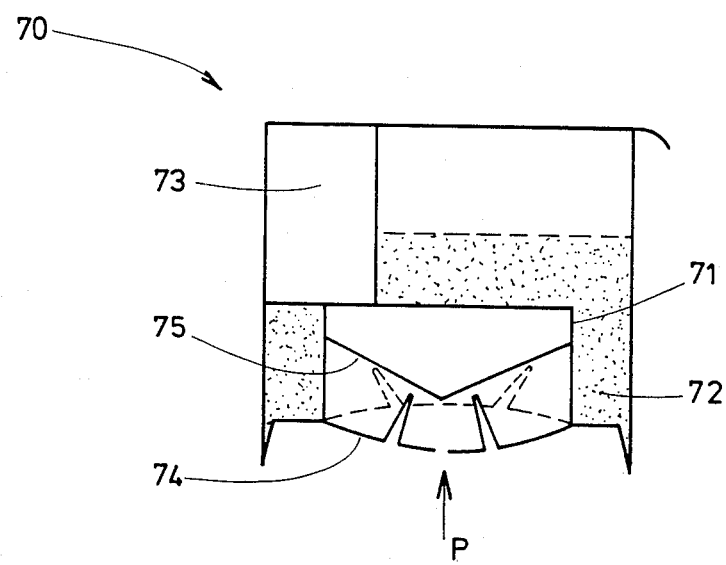
FIG. 7 is a lateral view of a fifth embodiment of heat transfer package.

According to FIG. 7, the heat transfer package constitutes a fifth embodiment. It comprises a receptacle 70 and a thermal capsule 71 immersed in the drink or food 72. A solute reservoir 73 may be placed in the upper part of the receptacle 70, for example.

The capsule 71 has a deformable wall 74 lining the bottom 75, one of the two faces carrying an inflammable material, the other serving as a friction means.

According to this form of embodiment, pressure or traction may be applied to the deformable wall 74 of the capsule 71 causing the wall 74 to rub on the bottom 75 of the thermal capsule 71. The heat thus produced makes it possible to trigger an exothermal oxido-reduction reaction in the capsule 71.

Distribution is conducted in accordance with one of the ways described with reference to the preceding embodiments.

In accordance with FIGS. 1 to 7, the exothermal chemical reactions obtained inside the heating capsule furnish the heat desired by performing either an oxido-reduction reaction or the chemical reactivity of alkaline and alkaline-earth derivatives, by their properties of hydration, hydrolysis and neutralization. The inventor indicates hereinafter the four main groups of reactions chosen by way of example:

Group 1:
Reaction of water on an alkaline earth oxide (CaO, BaO, SrO) in the presence or otherwise of compounds such as metallic halide (NaCl, $MgCl_2$ ...) strong base (NaOH, KOH) or adjuvant such as: soap, fatty matter, charcoal, sugar polyalcohol.

Group 2:
Reaction on a strong base ($Mg(OH)_2$, HaOH ...) of a metallic oxide (CaO ...), a metallic halide ($CaCl_2$, $MgCl_2$ ...), of an acid (HCl ...).

Group 3:
Reaction of an acid (HCl) on an alkaline earth oxide (CaO, BaO).

The addition of a small quantity of soap or fatty matter renders the reaction biphase, the first phase of neutralization of the acid being relayed by the hydration reaction.

Group 4:
Oxido-reduction reaction between an oxidizer and a reducer to be chosen from among boric anhydride or the oxides of lead, iron, manganese, copper and furthermore aluminum silicon ..., alone or in the presence of an inert substance.

The endothermal chemical reactions obtained by bringing the chemical reagents into contact with one another in the thermal capsule provide the heat desired by utilizing the chemical reactivity of salts, by their hydration and dissolution properties.

The inventor indicates hereinafter the main reactions chosen by way of example:

reaction of water on ammonium nitrate or sodium nitrate, reaction of ammonium nitrate on sodium carbonate crystallized in equilibrium with a saturated solution of sodium carbonate;

reaction of a diluted acid ($HNO_3$ for example) on ammonium nitrate and sodium sulphate.

According to FIGS. 1 to 7, the different types of heat transfer packages are capable of being provided with a temperature indicator, not shown. This consists of a warning device placed on the outside of the enclosures. This warning device takes the form of colored indicator or a small inflatable pocket or a "syringe" containing a compound the boiling point of which is not very high, such as acetone or ether, possibly mixed with water. When the effect of excessive temperature of exposure causes the fluid to boil, this gives rise to an increase in reversible volume of the pocket or "syringe", making this instantly visible to the user, so preventing any non intentional triggering of the reaction.

The term "food product" used in the appended claims means either a drink or food.

I claim:

1. A single use heat transfer package for a food product comprising a closed receptacle having top, bottom and side walls, one of said receptacle walls being deformable upon the manual application of a force thereto from the exterior of said receptacle without the deformation of said receptacle wall opening said closed receptacle, a food product in said closed receptacle, a closed thermal capsule disposed within said receptacle and at least partially immersed in said food product, the interior of said closed capsule containing a separator that subdivides said interior into two chambers, said two chambers respectively containing different chemical reagents which, when combined, produce a chemical reaction within said capsule that changes the temperature of said thermal capsule and of the food product in which said capsule is immersed without opening said closed capsule, said thermal capsule having an exterior wall which is deformable upon the application of a force thereto without opening said capsule, said deformable wall of said thermal capsule being spaced from said deformable wall of said closed receptacle, means within said capsule for coupling said deformable wall of said receptacle to said deformable wall of said capsule whereby deformation of said deformable wall of said receptacle upon the manual application of an external force thereto causes deformation of said deformable wall of said thermal capsule, said separator within said capsule being coupled to said deformable wall of said capsule and being so constructed that deformation of said deformable wall of said capsule displaces said separator within said capsule to cause injection of one of said chemical reagents from one of said chambers past said separator into the other of said chambers and into contact with the other of said chemical reagents to initiate said chemical reaction.

2. The heat transfer package of claim 1 wherein said food product is a drink which is extemporaneously prepared within said package by the combining of a solvent and a solute, means subdividing the interior of said receptacle into two regions one of which contains said solvent and the other of which contains said solute, each of said regions being exterior of said closed thermal capsule, and means within said closed receptacle responsive to deformation of said deformable wall of said receptacle for combining said solvent and solute with one another within said receptacle and external to said thermal capsule.

3. The heat transfer package of claim 1 wherein said separator comprises a disc having at least one orifice therein, said two chambers being located on opposite sides of said disc respectively, at least one of said chambers containing a liquid chemical reagent, and a member within said capsule coupling said disc to said deformable wall of said thermal capsule whereby deformation of said deformable wall of said capsule causes said member to displace said disc into said liquid chemical reagent containing chamber to force a flow of the liquid reagent from said one of said chambers via said orifice into the other of said chambers.

4. The heat transfer package of claim 3 wherein said orifice is normally closed, said displacement of said disc shaped member within said thermal capsule being operative to open said orifice.

5. The heat transfer package of claim 1 wherein said thermal capsule is supported within said closed receptacle in spaced relation to said top, bottom, and side walls of said closed receptacle, a portion of said food product within said receptacle being located between said deformable walls of said receptacle and capsule.

6. The heat transfer package of claim 1 wherein said thermal capsule is totally immersed within said food product with portions of said food product being located between each of the exterior walls of said capsule and the interior surfaces of each of said top, bottom and side walls of said receptacle.

7. The heat transfer package of claim 1 wherein said chemical reaction is an exothermal reaction.

8. The heat transfer package of claim 1 wherein said chemical reaction is an endothermal reaction.

9. The heat transfer package of claim 1 wherein said deformable wall of said receptacle is said bottom wall, and means in said top wall of said receptacle for selectively dispensing said food product from said receptacle.

10. The heat transfer package of claim 1 wherein said means coupling said deformable wall of said receptacle to said deformable wall of said thermal capsule comprises a rod disposed within said receptacle and extending between said deformable walls.

* * * * *